(12) United States Patent
Kim et al.

(10) Patent No.: US 12,191,085 B2
(45) Date of Patent: Jan. 7, 2025

(54) MULTILAYER CAPACITOR

(71) Applicant: SAMSUNG ELECTRO-MECHANICS CO., LTD., Suwon-si (KR)

(72) Inventors: Hwi Dae Kim, Suwon-si (KR); Taek Jung Lee, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 64 days.

(21) Appl. No.: 17/846,674

(22) Filed: Jun. 22, 2022

(65) Prior Publication Data

US 2023/0096227 A1 Mar. 30, 2023

(30) Foreign Application Priority Data

Sep. 29, 2021 (KR) .................. 10-2021-0128817

(51) Int. Cl.
*H01G 4/30* (2006.01)
*H01G 4/008* (2006.01)
*H01G 4/012* (2006.01)
*H01G 4/12* (2006.01)
*H01G 4/232* (2006.01)

(52) U.S. Cl.
CPC .............. *H01G 4/30* (2013.01); *H01G 4/008* (2013.01); *H01G 4/012* (2013.01); *H01G 4/12* (2013.01); *H01G 4/232* (2013.01)

(58) Field of Classification Search
CPC .......... H01G 4/30; H01G 4/008; H01G 4/012; H01G 4/12; H01G 4/232; H01G 4/005

USPC ............. 361/301.4, 321.1, 303, 306.3, 321.3
See application file for complete search history.

(56) References Cited

U.S. PATENT DOCUMENTS

| 6,038,121 | A | 3/2000 | Naito et al. |
| 2008/0174935 | A1 | 7/2008 | Togashi et al. |
| 2009/0086406 | A1* | 4/2009 | Lee .................. H01G 4/228 361/306.3 |

(Continued)

FOREIGN PATENT DOCUMENTS

| JP | 2000-114096 A | 4/2000 |
| JP | 6309313 B2 | 3/2018 |

(Continued)

*Primary Examiner* — Arun Ramaswamy
(74) *Attorney, Agent, or Firm* — MORGAN, LEWIS & BOCKIUS LLP

(57) ABSTRACT

A multilayer capacitor includes a body including a dielectric layer and first and second internal electrodes, first external electrodes respectively be connected to the first internal electrode and second external electrodes respectively connected to the second internal electrode. The first internal electrode includes a first main portion and a first lead-out portion. The first lead-out portion includes a first inclined portion and a first connection portion. The first inclined portion is connected to the first main portion and has a side surface, at least a portion of which is inclined with respect to a side surface of the first main portion connected thereto. The first connection portion is connected to the first inclined portion and the first external electrode, and has a side surface, at least a portion of which is inclined with respect to the side surface of the first inclined portion connected thereto.

19 Claims, 6 Drawing Sheets

(56) References Cited

U.S. PATENT DOCUMENTS

| | | | |
|---|---|---|---|
| 2009/0213525 A1* | 8/2009 | Lee | H01G 4/30 |
| | | | 361/303 |
| 2009/0279228 A1* | 11/2009 | Lee | H01G 4/012 |
| | | | 361/301.4 |
| 2015/0041199 A1 | 2/2015 | Lee et al. | |
| 2016/0133383 A1* | 5/2016 | Park | H01G 4/30 |
| | | | 361/303 |
| 2016/0240314 A1* | 8/2016 | Fujii | H01G 4/232 |
| 2019/0027312 A1 | 1/2019 | Muramatsu et al. | |

FOREIGN PATENT DOCUMENTS

| | | |
|---|---|---|
| KR | 10-1421424 B1 | 7/2014 |
| KR | 10-2077617 B1 | 2/2020 |

* cited by examiner

MULTILAYER CAPACITOR

CROSS-REFERENCE TO RELATED APPLICATION(S)

This application claims benefit of priority to Korean Patent Application No. 10-2021-0128817 filed on Sep. 29, 2021 in the Korean Intellectual Property Office, the disclosure of which is incorporated herein by reference in its entirety.

TECHNICAL FIELD

The present disclosure relates to a multilayer capacitor.

BACKGROUND

A capacitor is a device which may store electricity, and operates on a principle in which electricity is accumulated in each of two electrodes of the capacitor generally when a voltage is applied to the capacitor in a state in which the two electrodes are disposed opposite to each other. In a case in which a direct current (DC) voltage is applied to the capacitor, a current flows in the capacitor while the electricity is accumulated in the capacitor. However, the current does not flow in the capacitor when the accumulation of the electricity is completed. Meanwhile, in a case in which an alternating current (AC) voltage is applied to the capacitor, an AC current flows in the capacitor while polarities of the electrodes are alternated with each other.

The capacitor may be classified into several types based on a type of an insulator positioned between the electrodes such as an aluminum electrolytic capacitor in which the electrodes are made of aluminum and a thin oxide film is disposed between these aluminum electrodes, a tantalum capacitor in which tantalum is used as an electrode material, a ceramic capacitor in which a dielectric material of a high dielectric constant such as a barium titanate is positioned between the electrodes, a multilayer ceramic capacitor (MLCC) in which ceramic of a high dielectric constant, formed in a multilayer structure, is used as a dielectric material positioned between the electrodes, a film capacitor in which a polystyrene film is used as a dielectric material positioned between the electrodes, etc.

Among these capacitors, the multilayer ceramic capacitor has excellent temperature and frequency characteristics and may be implemented in a small size, and has thus been recently used widely in various fields such as a high frequency circuit. In recent years, there have been continuous efforts to make the multilayer ceramic capacitor smaller, and the dielectric layer and the internal electrodes are made thinner to this end.

In accordance with an increasing demand in recent years for reducing a thickness of an electronic component, research has been continuously conducted to reduce the thickness of the multilayer ceramic capacitor. However, when having a smaller thickness, the multilayer ceramic capacitor may have difficulty in sufficiently securing its electrical characteristics.

SUMMARY

An aspect of the present disclosure may provide a multilayer capacitor having improved electrical characteristics. Another aspect of the present disclosure may provide a multilayer capacitor having improved manufacturing efficiency and moisture resistance characteristics.

According to an aspect of the present disclosure, a multilayer capacitor includes a body including a dielectric layer and first and second internal electrodes stacked on each other with the dielectric layer interposed therebetween; a pair of first external electrodes respectively disposed on first and second corners of the body opposing to each other in a first diagonal direction, and connected to the first internal electrode, and a pair of second external electrodes respectively disposed on third and fourth corners of the body opposing to each other in a second diagonal direction, and connected to the second internal electrode. The first internal electrode includes a first main portion and a first lead-out portion connected to the first external electrode and extending in the first diagonal direction in which the first or second corner and the first main portion are connected to each other. The first lead-out portion includes a first inclined portion and a first connection portion. The first inclined portion is connected to the first main portion and has a side surface, at least a portion of which is inclined with respect to a side surface of the first main portion connected thereto. The first connection portion is connected to the first inclined portion and one of the pair of first external electrodes, and has a side surface, at least a portion of which is inclined with respect to the side surface of the first inclined portion connected thereto.

The second internal electrode includes a second main portion and a second lead-out portion connected to the second external electrode and extending in the second diagonal direction in which the third or fourth corner and the second main portion are connected to each other. The second lead-out portion includes a second inclined portion and a second connection portion. The second inclined portion is connected to the second main portion and has a side surface, at least a portion of which is inclined with respect to a side surface of the second main portion connected thereto. The second connection portion is connected to the second inclined portion and one of the pair of second external electrodes, and has a side surface, at least a portion of which is inclined with respect to the side surface of the second inclined portion connected thereto.

The first connection portion may have a width wider from a region in which the first connection portion is connected to the first inclined portion, in the first diagonal direction.

The first connection portion may be spaced apart from an end of the one of the pair of first external electrodes.

50 μm or more may be a margin length by which the first connection portion is spaced apart from the end of the first external electrode, based on a length of the multilayer capacitor, measured in a direction along which an edge of the body extends and which is different from a stacking direction of the first and second internal electrodes.

The margin length may be 150 μm or less.

The margin length may be less than or equal to a length of the first connection portion.

The side surface of the first connection portion may be perpendicular to the side surface of the first main portion.

The body may have a square structure based on a direction in which the first and second internal electrodes are stacked on each other.

A length of one side of the square structure may have a value between −10% and +10% of (250+n*350) μm based on the direction in which the first and second internal electrodes are stacked on each other, where "n" may be a natural number.

The multilayer capacitor may have a thickness of 70 μm or less when the thickness is defined based on its length measured in the direction in which the first and second internal electrodes are stacked on each other.

The first inclined portion may include two side surfaces connected to the first main portion, and the two side surfaces may be parallel to each other.

The first inclined portion may include two side surfaces connected to the first main portion, and the two side surfaces may not be parallel to each other.

The first inclined portion may have a width narrower from the first main portion to the first connection portion.

A sum of lengths of the first inclined portion and the first connection portion may be less than half a length of the body, based on a length of the multilayer capacitor, measured in a direction along which an edge of the body extends and which is different from a stacking direction of the first and second internal electrodes.

According to another aspect of the present disclosure, a multilayer capacitor includes a body including a dielectric layer and first and second internal electrodes stacked on each other with the dielectric layer interposed therebetween, a pair of first external electrodes respectively disposed on first and second corners of the body opposing to each other in a first diagonal direction, and connected to the first internal electrodes, and a pair of second external electrodes respectively disposed on third and fourth corners of the body opposing to each other in a second diagonal direction, and connected to the second internal electrode. The first internal electrode includes a first main portion and a first lead-out portion connected to the first external electrode and extending in the first diagonal direction in which the first or second corner and the first main portion are connected to each other. The first lead-out portion includes a first inclined portion connected to the first main portion and having a side surface, at least a portion of which is inclined with respect to a side surface of the first main portion connected thereto. The first inclined portion includes two side surfaces connected to the first main portion, and the two side surfaces are not parallel to each other.

The second internal electrode includes a second main portion and a second lead-out portion connected to the second external electrode and extending in the second diagonal direction in which the third or fourth corner and the second main portion are connected to each other. The second lead-out portion includes a second inclined portion connected to the second main portion and having a side surface, at least a portion of which is inclined with respect to a side surface of the second main portion connected thereto.

The first inclined portion may be directly connected to the first external electrode.

According to another aspect of the present disclosure, a multilayer capacitor includes a body including a dielectric layer and first and second internal electrodes stacked on each other with the dielectric layer interposed therebetween; a first external electrode disposed on a corner of the body and connected to the first internal electrode; and a second external electrode disposed on another corner of the body and connected to the second internal electrode. The first internal electrode includes a first main portion, and a first lead-out portion connected to the first external electrode and extending in the diagonal direction in which the corner and the first main portion are connected to each other. The first lead-out portion includes a first inclined portion connected to the first main portion. The first inclined portion includes side surfaces connected to the first main portion and inclined with respect to each other.

The first inclined portion may have a width narrower from the first main portion to the first connection portion.

BRIEF DESCRIPTION OF DRAWINGS

The above and other aspects, features and advantages of the present disclosure will be more clearly understood from the following detailed description taken in conjunction with the accompanying drawings, in which.

Figure 1:
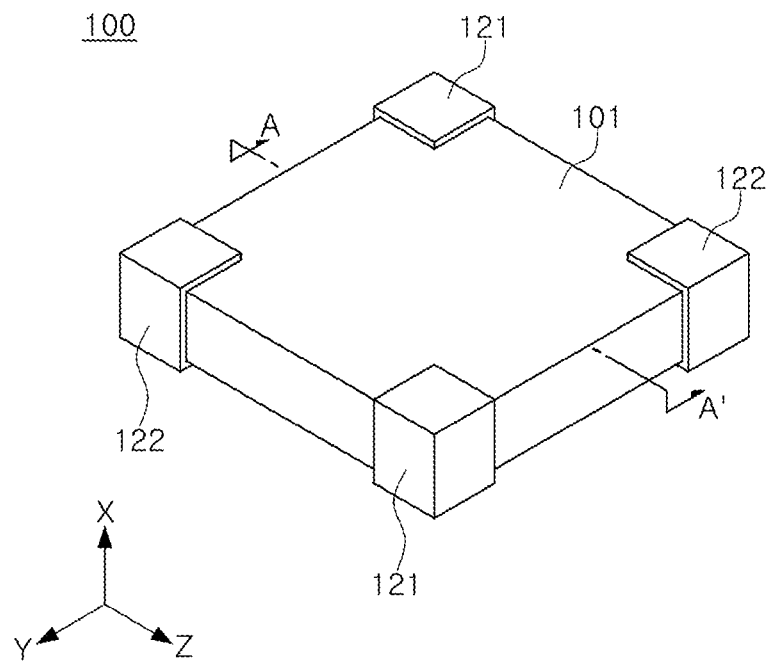
FIG. 1 is a perspective view schematically showing an appearance of a multilayer capacitor according to an exemplary embodiment of the present disclosure.
Figure 6:
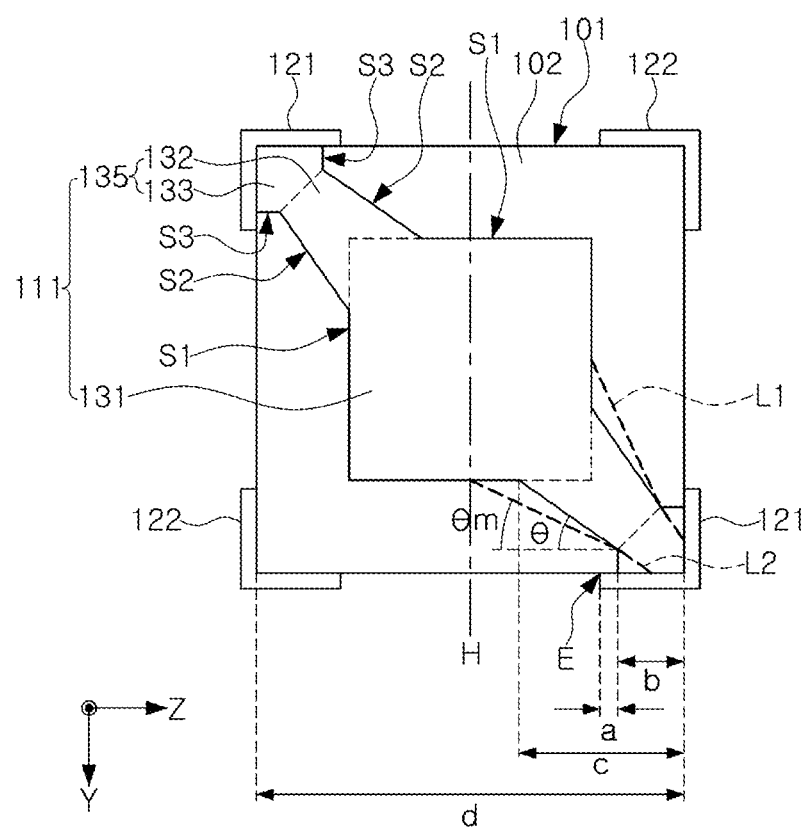
Figure 7:
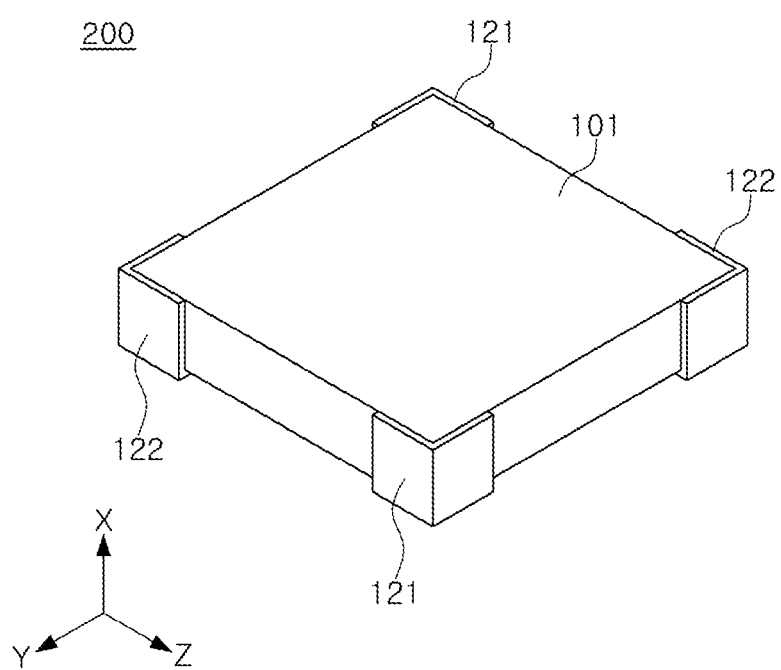

Each of FIGS. 2 through 5 is a cross-sectional view of the multilayer capacitor of FIG. 1;

FIG. 6 illustrates a shape of an internal electrode according to a modified example of the multilayer capacitor; and FIG. 7 illustrates an appearance of a multilayer capacitor according to another modified example of the multilayer capacitor.

DETAILED DESCRIPTION

Hereinafter, exemplary embodiments of the present disclosure will now be described in detail with reference to the accompanying drawings.

FIG. 1 is a perspective view schematically showing an appearance of a multilayer capacitor according to an exemplary embodiment of the present disclosure, each of FIGS. 2 through 5 is a cross-sectional view of the multilayer capacitor of FIG. 1, and FIG. 6 illustrates a shape of an internal electrode according to a modified example of the multilayer capacitor.

Referring to FIGS. 1 through 4, a multilayer capacitor 100 according to an exemplary embodiment of the present disclosure includes a body 101 including a dielectric layer 102 and first and second internal electrodes 111 and 112 stacked on each other with the dielectric layer 102 interposed therebetween and first and second external electrodes 121 and 122.

Figure 2:
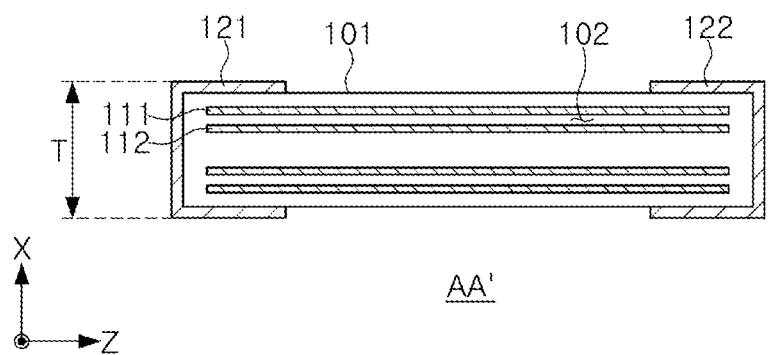
Figure 3:
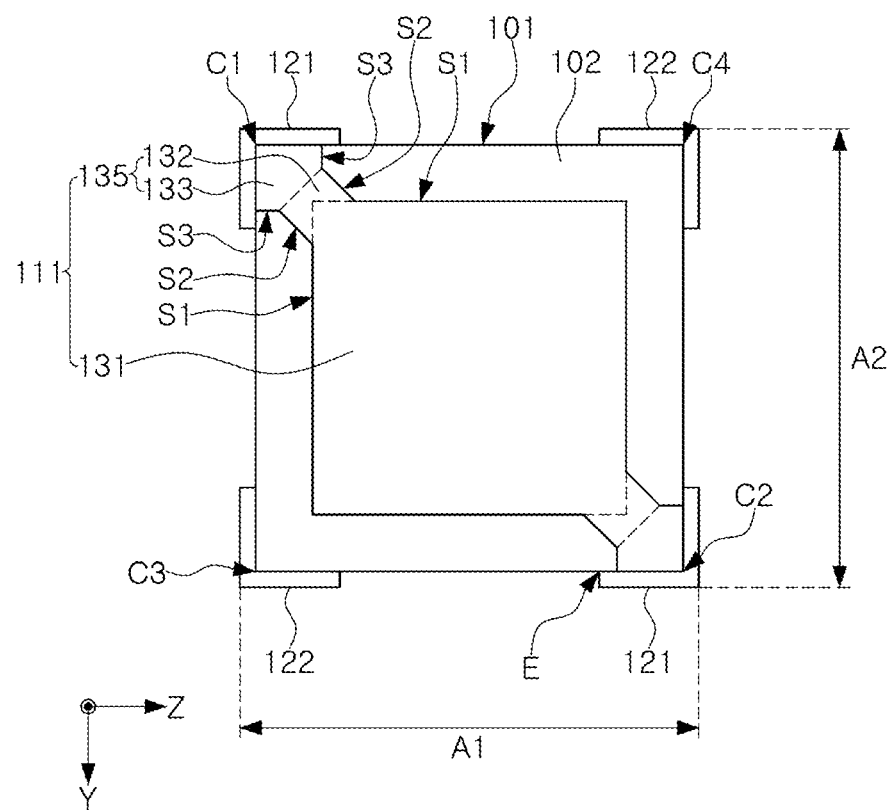

The body 101 includes the dielectric layer 102, and may be obtained by stacking a plurality of green sheets on each other and then sintering the same for example. The plurality of dielectric layers 102 may have an integrated shape by a sintering process. In addition, as shown in FIGS. 2 through 4, the body 101 may have a square structure based on (or viewed in) a direction (X direction) in which the first and second internal electrodes 111 and 112 are stacked on each other.

The dielectric layer 102 included in the body 101 may include a ceramic material having a high dielectric constant, barium titanate ($BaTiO_3$) based ceramics for example, and may also include any other material known in the art as long as the capacitor obtains sufficient capacitance. The dielectric layer 102 may further contain an additive, an organic solvent, a plasticizer, a binder, a dispersant and the like, if necessary, in addition to the ceramic material which is a main component. Here, when using the additive, the dielectric layer may include the additive in the form of a metal oxide during the manufacturing process. The metal oxide additive may include, for example, at least one of manganese dioxide ($MnO_2$), dysprosium oxide ($Dy_2O_3$), barium oxide ($BaO$), magnesium oxide ($MgO$), aluminium oxide ($Al_2O_3$), silicon dioxide ($SiO_2$), chromium (III) oxide ($Cr_2O_3$) and calcium carbonate ($CaCO_3$).

The first and second internal electrodes 111 and 112 may be disposed in the body 101, and these internal electrodes may be obtained, for example, by printing a paste, which includes a conductive metal having a predetermined thickness, on one surface of a ceramic green sheet and then sintering the same. A main constituent material included in the first and second internal electrodes 111 and 112 may be copper (Cu), nickel (Ni), silver (Ag), palladium (Pd) or the like, and may also be an alloy thereof. Referring to FIG. 3, the first internal electrode 111 may be connected to the pair of first external electrodes, and include a first main portion 131 and a first lead-out portion 135. The first lead-out portion 135 may be connected to the first external electrode by being extended in a diagonal direction in which the first corner C1 or second corner C2 of the body 101 and the first main portion 131 are connected to each other. The first lead-out portion 135 may include a first inclined portion 132 connected to the first main portion 131, and a first connection portion 133 connected to the first inclined portion 132 and the first external electrode. The first inclined portion 132 may have a side surface S2 at least a portion of which is inclined with respect to a side surface S1 of the first main portion 131 connected thereto. In addition, the first connection portion 133 may have a side surface S3 at least a portion of which is inclined with respect to the side surface S2 of the first inclined portion 132.

Figure 4:
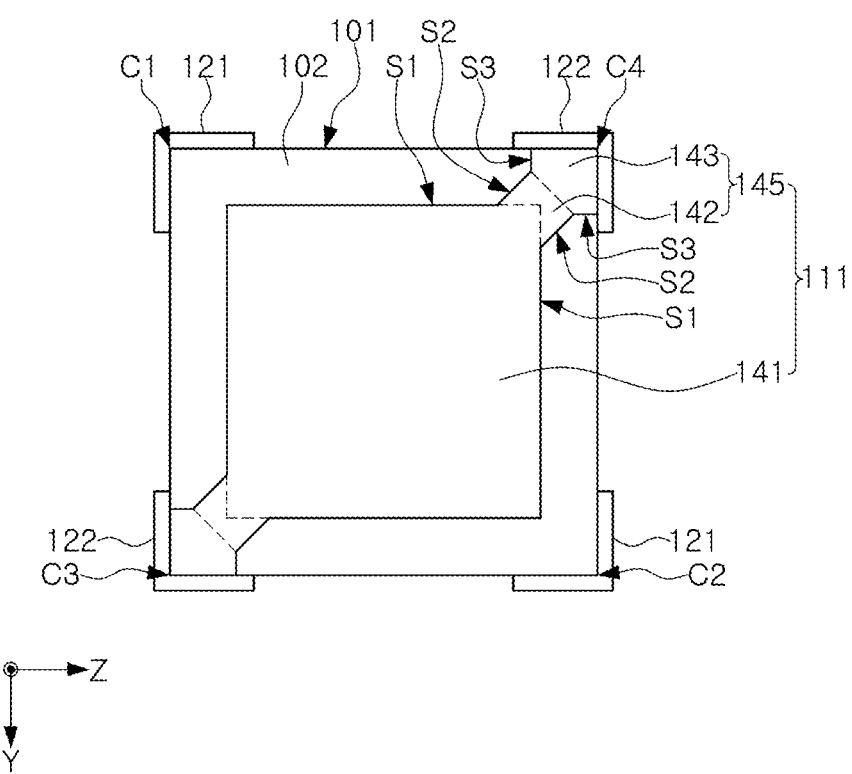
Figure 5:
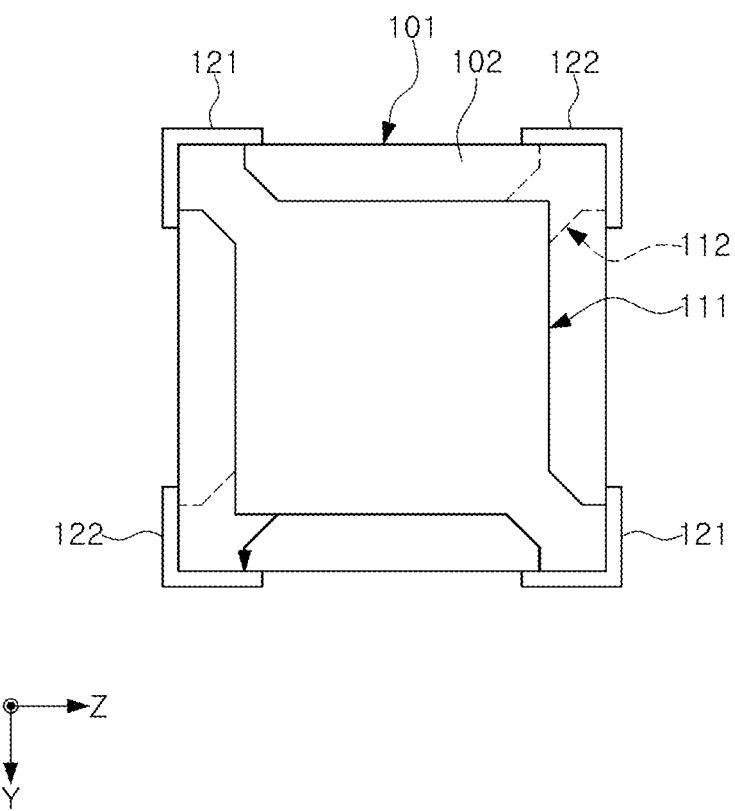

Referring to FIG. 4, the second internal electrode 112 may be connected to the pair of second external electrodes, and include a second main portion 141 and a second lead-out portion 145. The second lead-out portion 145 may be connected to the second external electrode by being extended in a diagonal direction in which the third corner C3 or fourth corner C4 of the body 101 and the second main portion 141 are connected to each other. The second lead-out portion 145 may include a second inclined portion 142 connected to the second main portion 141, and a second connection portion 143 connected to the second inclined portion 142 and the second external electrode. The second inclined portion 142 may have the side surface S2 at least a portion of which is inclined with respect to the side surface S1 of the second main portion 141 connected to the second inclined portion 142. In addition, the second connection portion 143 may have the side surface S3 at least a portion of which is inclined with respect to the side surface S2 of the second inclined portion 142.

One or more pairs of first external electrodes may respectively be disposed on the first and second corners C1 and C2 of the body 101, which are not adjacent to each other, and may be connected to the first internal electrode 111. Similarly, one or more pairs of second external electrodes may respectively be disposed on the third and fourth corners C3 and C4 of the body 101, which are not adjacent to each other, and may be connected to the second internal electrode 112. The first and second external electrodes 121 and 122 may each be made of any material having electrical conductivity, such as a metal, use a specific material determined in consideration of electrical characteristics, structural stability or the like, and have a multilayer structure. For example, the first and second external electrodes 121 and 122 may each be a fired electrode including the conductive metal and glass, and may further include a plating layer covering the first and second external electrodes 121 and 122. The conductive metals which may be included in this fired electrode may be, for example, one or more of nickel (Ni), copper (Cu) and an alloy thereof. In addition, the plating layer may serve to improve mount characteristics of the external electrode, may include at least one of nickel (Ni), tin (Sn), palladium (Pd) and an alloy thereof, and may include a plurality of layers.

When having a four-terminal structure as in this exemplary embodiment, the multilayer capacitor 100 may maintain high rigidity even when having a small thickness. Here, the multilayer capacitor 100 may have a thickness T of about 70 μm or less when the thickness is defined based on its length measured in the direction (i.e., X direction) in which the first and second internal electrodes 111 and 112 are stacked on each other. In addition, an equivalent series inductance (ESL) may be reduced as the external electrodes 121 and 122 having different polarities are alternately disposed at the corners C1, C2, C3 and C4 of the body 101. However, when the multilayer capacitor 100 has the four-terminal structure, areas of the first and second external electrodes 121 and 122 may each be relatively reduced, and a contact area between the internal electrodes 111 and 112 and the external electrodes 121 and 122 may thus be reduced, which may be disadvantageous in terms of an equivalent series resistance (ESR). This exemplary embodiment devises a shape of the internal electrodes 111 and 112 in comprehensive consideration of efficiency of its manufacturing process as well as the electrical characteristics, and the devised shape is described below. Hereinafter, the description is made based on the first internal electrode 111, which may also be applied to the second internal electrode 112.

As described above, the first internal electrode 111 may include the first main portion 131 and the first lead-out portion 135, and the first main portion 131 may form a capacitance. The first lead-out portion 135 may include the first inclined portion 132 and the first connection portion 133. As described in this exemplary embodiment, when the first lead-out portion 135 is extended in the diagonal direction of the body 101, a current path may be shortened, thereby reducing the ESR and the ESL. That is, referring to FIG. 5, as an example of a current flow, the current path (indicated by an arrow) from the first internal electrode 111 to the second internal electrode 112 may be relatively shortened compared to a case without the first inclined portion 132. However, according to a study conducted by the present inventors, when the internal electrode includes only the first inclined portion 132, there may be an increased probability that a misalignment between the first inclined portion 132 and the external electrode occurs in processes of cutting the internal electrode and applying the external electrode on the body, which is because the first inclined portion 132 has a relatively narrow width. In consideration of this probability, the present embodiment employs the first connection portion 133, and the first connection portion 133 has the side surface S3 inclined with respect to the side surface S2 of the first inclined portion 132. Due to the first connection portion 133, the contact area between the first lead-out portion 135 and the first external electrode may be increased, thereby not only reducing the ESR, but also performing this alignment process more accurately and efficiently in the process of applying the external electrode on the body. When having the small thickness as in this exemplary embodiment, the multilayer capacitor 100 may have a further increasing need for improving its electrical characteristics and process efficiency.

In more detail, as shown in the drawing, the first lead-out portion 135 may have the first connection portion 133 whose width is wider from a region in which the first connection portion 133 is connected to the first inclined portion 132, in the diagonal direction. In addition, the first connection portion 133 may be spaced apart from an end E of the first external electrode. In terms of the ESR and ESL reduction, it may be more advantageous that the first connection portion 133 is closer to the end E of the first external electrode. However, when the first connection portion 133 is too close to the end E of the first external electrode, there may be an increased probability that external moisture infiltrates in the first connection portion and a misalignment between the first connection portion 133 and the external electrode occurs. In consideration of this probability, 50 μm or more may be a margin length (indicated by "a" in FIG. 6) by which the first connection portion 133 is spaced apart from the end E of the first external electrode, based on a length of the multilayer capacitor 100, measured in a direction (i.e., Z direction) in which the first and second external electrodes 121 and 122 oppose each other. In this case, a margin length "a" may be set to about 150 μm or less for the contact area between the contact area between the first internal electrode 111 and the first external electrode not to be excessively reduced due to the increased margin length "a". If this setting is expressed as a more general condition referring to FIG. 6, the margin length "a" may be less than or equal to a length "b" of the first connection portion. This condition may indicate that the margin length "a" is not greater than half a length a+b of the first external electrode, in one direction.

As shown in the drawing, the side surface S3 of the first connection portion 133 may be disposed perpendicular to the side surface S1 of the first main portion 131, and this disposition is derived by comprehensive considering the contact area between the first internal electrode 111 and the first external electrode, the margin length "a", etc.

As described above, the body 101 may have the square structure based on the direction (i.e., X direction) in which the first and second internal electrodes 111 and 112 are stacked on each other, and the multilayer capacitor 100 may thus have an overall shape similar to a square. For example, the multilayer capacitor 100 may have a size in which a length of a side A1 or A2 is (250+n*350) μm based on the X direction, where "n" may be a natural number. For example, when "n" is 1, the multilayer capacitor 100 has a size of 600 μm*600 μm. However, when considering an error range, the length of the one side A1 or A2 may have a value between −10% and +10% of (250+n*350) μm. Here, the length of the one side may be a multiple of 350 μm in consideration of a pitch value of a solder ball and the like when the multilayer capacitor 100 is mounted on a board. In addition, the thickness T of the multilayer capacitor 100 may be as small as 70 μm or less, based on its length measured in the X direction. Meanwhile, the thickness T and length of the one side A1 or A2 of the multilayer capacitor 100 may indicate a maximum value among values measured in a plurality of regions, or may be a value obtained by averaging the plurality of values.

In an example shown in FIG. 3, the first inclined portion 132 may include two side surfaces S2 connected to the first main portion 131, and the two side surfaces S2 may be parallel to each other. However, the two side surfaces S2 may not necessarily have to be parallel to each other, and their dispositions may be modified as shown in FIG. 6. Referring to FIG. 6, the two side surfaces S2 of the first inclined portion 132 may not be parallel to each other. In this case, the first inclined portion 132 may have a width narrower from the first main portion 131 to the first connection portion 133. As shown in the embodiment of FIG. 6, when the two side surfaces S2 of the first inclined portion 132 are not parallel to each other, the length of the inclined portion 132 may be relatively increased, thereby further increasing the reduction effect of the ESR and the ESL, obtained by the current path described above. However, if the length of the inclined portion 132 becomes excessively long, a capacitance change and a capacitance distribution may occur, and it is thus necessary to also consider this probability. A sum of the lengths of the first inclined portion 132 and the first connection portion 133 may be less than half a length "d" of the body 101, based on the length of the multilayer capacitor 100, measured in the direction (i.e., Z direction) in which the first and second external electrodes 121 and 122 are connected to each other. When having the widest width in a region in which the first inclined portion 132 is connected to the first main portion 131, the first inclined portion 132 may be in contact with a center line H of the body 101 in the Z direction, which may be indicated by a line L1.

Meanwhile, the reduction effect of the ESR and the ESL, obtained by the current path may be improved by the structure in which the two side surfaces S2 of the first inclined portion 132 are not parallel to each other as described above. In this case, the multilayer capacitor 100 may not employ the first connection portion 133 if necessary. This shape is intended to maximize the reduction effect of the ESR and the ESL, obtained by the current path while tolerating the misalignment reduction effect lower than that described above to some extent. That is, FIG. 6 illustrates that the first inclined portion 132 may be extended along a line L2 to be directly connected to the first external electrode, which also belongs to an aspect of the present disclosure.

Another modified example of the multilayer capacitor is described with reference to FIG. 7. A multilayer capacitor 200 of FIG. 7 is different from the previous embodiments only in the shape of the first and second external electrodes 121 and 122, and the other components may be employed in the same way. In this modified example, the first and second external electrodes 121 and 122 may be formed on the side surface and lower surface of the body 101, and not on a top surface thereof. This structure may allow the first and second external electrodes 121 and 122 to each have a reduced thickness, which may be more advantageous for making the multilayer capacitor 100 thinner.

The present inventors test the electrical characteristics and defect based on the shape of the lead-out portion of the internal electrodes, and the results are summarized in Table 1 below. For a test condition, the multilayer capacitor has a 600 μm*600 μm square structure, and in the defect test, a good product is marked with O and a defective product is marked with X. An example that does not satisfy a criterion presented in the above-described embodiment of the present disclosure is marked with *.

TABLE 1

| | | | | Electrical characteristics | | Defect test | | |
| | | | | | | | Moisture | |
| Ex. | a (μm) | $\theta_m$ (°) | θ (°) | ESL (pH) | ESR (mΩ) | Capacitance distribution | resistance reliability | Alignment characteristics |
| --- | --- | --- | --- | --- | --- | --- | --- | --- |
| 1* | 75 | 11.98 | 90 | 36.36 | 17.20 | O | O | O |
| 2 | 75 | 11.98 | 85 | 35.91 | 16.99 | O | O | O |

TABLE 1-continued

| | | | | Electrical characteristics | | Defect test | | |
| | | | | | | | Moisture | |
| Ex. | a (μm) | $\theta_m$ (°) | θ (°) | ESL (pH) | ESR (mΩ) | Capacitance distribution | resistance reliability | Alignment characteristics |
|---|---|---|---|---|---|---|---|---|
| 3 | 75 | 11.98 | 80 | 35.54 | 16.80 | ○ | ○ | ○ |
| 4 | 75 | 11.98 | 75 | 35.23 | 16.61 | ○ | ○ | ○ |
| 5 | 75 | 11.98 | 70 | 34.97 | 16.44 | ○ | ○ | ○ |
| 6 | 75 | 11.98 | 65 | 34.75 | 16.27 | ○ | ○ | ○ |
| 7 | 75 | 11.98 | 60 | 34.55 | 16.09 | ○ | ○ | ○ |
| 8 | 75 | 11.98 | 55 | 34.35 | 15.91 | ○ | ○ | ○ |
| 9 | 75 | 11.98 | 50 | 34.14 | 15.72 | ○ | ○ | ○ |
| 10 | 75 | 11.98 | 45 | 33.91 | 15.52 | ○ | ○ | ○ |
| 11 | 75 | 11.98 | 40 | 33.64 | 15.29 | ○ | ○ | ○ |
| 12 | 75 | 11.98 | 35 | 33.31 | 15.04 | ○ | ○ | ○ |
| 13 | 75 | 11.98 | 30 | 32.91 | 14.77 | ○ | ○ | ○ |
| 14 | 75 | 11.98 | 25 | 32.43 | 14.46 | ○ | ○ | ○ |
| 15 | 75 | 11.98 | 20 | 31.85 | 14.11 | ○ | ○ | ○ |
| 16 | 75 | 11.98 | 15 | 31.15 | 13.72 | ○ | ○ | ○ |
| 17* | 75 | 11.98 | 10 | 30.32 | 13.28 | X | ○ | ○ |
| 18* | 75 | 11.98 | 5 | 29.35 | 12.80 | X | ○ | ○ |
| 19 | 50 | 14.04 | 90 | 32.34 | 14.62 | ○ | ○ | ○ |
| 20 | 50 | 14.04 | 45 | 30.80 | 13.02 | ○ | ○ | ○ |
| 21 | 50 | 14.04 | 25 | 28.76 | 12.33 | ○ | ○ | ○ |
| 22* | 50 | 14.04 | 10 | 27.40 | 11.34 | X | ○ | ○ |
| 23* | 25 | 16.93 | 90 | 28.94 | 12.39 | ○ | X | X |
| 24* | 25 | 16.93 | 45 | 27.76 | 11.13 | ○ | X | X |
| 25* | 25 | 16.93 | 25 | 26.28 | 10.57 | ○ | X | X |
| 26* | 25 | 16.93 | 10 | 24.30 | 9.81 | X | X | X |
| 27* | 0 | 21.25 | 90 | 25.58 | 10.72 | ○ | X | X |

When checking the test results above, it may be first confirmed that the moisture resistance reliability is weak when the margin length "a" is less than 50 μm. In addition, the inclination of the inclined portion may be an inclined angle θ with respect to the Z direction. Here, there is no defect problem when the inclined portion has an angle greater than or equal to $\theta_m$, and there is a defect in the capacitance distribution when the inclined portion has an angle smaller than $\theta_m$. Here, $\theta_m$ may indicate the case in which the inclined portion has the widest width in region in which the inclined portion is connected with the main portion, that is, the case indicated by L1 in FIG. 6. In addition, in a case in which θ is 90° (Example 1), there is no defect problem as there is no inclined portion. However, the ESR and ESL characteristics are inferior to those of the exemplary embodiment of the present disclosure.

As set forth above, the multilayer capacitor according to an exemplary embodiment of the present disclosure may have at least one of the characteristics such as the electrical characteristics, the manufacturing efficiency and the moisture resistance characteristics.

While the exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including a dielectric layer and first and second internal electrodes stacked on each other with the dielectric layer interposed therebetween;
a pair of first external electrodes respectively disposed on first and second corners of the body opposing to each other in a first diagonal direction, and connected to the first internal electrode; and
pair of second external electrodes respectively disposed on third and fourth corners of the body opposing to each other in a second diagonal direction, and connected to the second internal electrode,
wherein the first internal electrode includes a first main portion, and a first lead-out portion connected to the first external electrode and extending in the first diagonal direction in which the first or second corner and the first main portion are connected to each other,
the first lead-out portion includes a first inclined portion and a first connection portion,
the first inclined portion is connected to the first main portion and has a side surface, at least a portion of which is inclined with respect to a side surface of the first main portion connected thereto,
the first connection portion is connected to the first inclined portion and one of the pair of first external electrodes, and has a side surface, at least a portion of which is inclined with respect to the side surface of the first inclined portion connected thereto, and
a width of the first inclined portion is greater than a length of the side surface of the first connection portion.

2. The multilayer capacitor of claim 1, wherein the second internal electrode includes a second main portion, and a second lead-out portion connected to the second external electrode and extending in the second diagonal direction in which the third or fourth corner and the second main portion are connected to each other,
the second lead-out portion includes a second inclined portion and a second connection portion,
the second inclined portion is connected to the second main portion and has a side surface, at least a portion of which is inclined with respect to a side surface of the second main portion connected thereto, and
the second connection portion is connected to the second inclined portion and one of the pair of second external electrodes, and has a side surface, at least a portion of which is inclined with respect to the side surface of the second inclined portion connected thereto.

3. The multilayer capacitor of claim 1, wherein the first connection portion has a width wider from a region in which the first connection portion is connected to the first inclined portion, in the first diagonal direction.

4. The multilayer capacitor of claim 1, wherein the first connection portion is spaced apart from an end of the one of the pair of first external electrodes.

5. The multilayer capacitor of claim 4, wherein 50 µm or more is a margin length by which the first connection portion is spaced apart from the end of the first external electrode, based on a length of the multilayer capacitor, measured in a direction along which an edge of the body extends and which is different from a stacking direction of the first and second internal electrodes.

6. The multilayer capacitor of claim 5, wherein the margin length is 150 µm or less.

7. The multilayer capacitor of claim 5, wherein the margin length is less than or equal to a length of the first connection portion.

8. The multilayer capacitor of claim 1, wherein the side surface of the first connection portion is perpendicular to the side surface of the first main portion.

9. The multilayer capacitor of claim 1, wherein the body has a square structure based on a direction in which the first and second internal electrodes are stacked on each other.

10. The multilayer capacitor of claim 9, wherein a length of one side of the square structure has a value between −10% and +10% of $(250+n*350)$ µm based on the direction in which the first and second internal electrodes are stacked on each other, and here "n" is a natural number.

11. The multilayer capacitor of claim 10, wherein the multilayer capacitor has a thickness of 70 µm or less when the thickness is measured in the direction in which the first and second internal electrodes are stacked on each other.

12. The multilayer capacitor of claim 1, wherein the first inclined portion includes two side surfaces connected to the first main portion, and the two side surfaces are parallel to each other.

13. The multilayer capacitor of claim 1, wherein the first inclined portion includes two side surfaces connected to the first main portion, and the two side surfaces are not parallel to each other.

14. The multilayer capacitor of claim 13, wherein the first inclined portion has a width narrower from the first main portion to the first connection portion.

15. The multilayer capacitor of claim 1, wherein a sum of lengths of the first inclined portion and the first connection portion is less than half a length of the body, based on a length of the multilayer capacitor, measured in a direction along which an edge of the body extends and which is different from a stacking direction of the first and second internal electrodes.

16. A multilayer capacitor comprising:
a body including a dielectric layer and first and second internal electrodes stacked on each other with the dielectric layer interposed therebetween;
a pair of first external electrodes respectively disposed on first and second corners of the body opposing to each other in a first diagonal direction, and connected to the first internal electrode; and
a pair of second external electrodes respectively disposed on third and fourth corners of the body opposing to each other in a second diagonal direction, and connected to the second internal electrode,
wherein the first internal electrode includes a first main portion, and a first lead-out portion connected to the first external electrode and extending in the first diagonal direction in which the first or second corner and the first main portion are connected to each other,
the first lead-out portion includes a first inclined portion connected to the first main portion and having a side surface, at least a portion of which is inclined with respect to a side surface of the first main portion connected thereto,
the first inclined portion includes two side surfaces connected to the first main portion, and the two side surfaces are not parallel to each other,
the first lead-out portion further includes a first connection portion connected to the first inclined portion and one of the pair of first external electrodes, and
the first connection portion has a side surface, at least a portion of which is inclined with respect to at least one of the two side surfaces of the first inclined portion connected thereto.

17. The multilayer capacitor of claim 16, wherein the second internal electrode includes a second main portion, and a second lead-out portion connected to the second external electrode and extending in the second diagonal direction in which the third or fourth corner and the second main portion are connected to each other, and
the second lead-out portion includes a second inclined portion connected to the second main portion and having a side surface, at least a portion of which is inclined with respect to a side surface of the second main portion connected thereto.

18. The multilayer capacitor of claim 16, wherein the first connection portion is directly connected to the one of the pair of first external electrodes.

19. A multilayer capacitor comprising:
a body including a dielectric layer and first and second internal electrodes stacked on each other with the dielectric layer interposed therebetween;
a first external electrode disposed on a corner of the body and connected to the first internal electrode; and
a second external electrode disposed on another corner of the body and connected to the second internal electrode,
wherein the first internal electrode includes a first main portion, and a first lead-out portion connected to the first external electrode and extending in the diagonal direction in which the corner and the first main portion are connected to each other,
the first lead-out portion includes a first inclined portion connected to the first main portion and a first connection portion connected to the first external electrode,
the first inclined portion includes side surfaces connected to the first main portion and inclined with respect to each other, and
the first inclined portion has a width narrower from the first main portion to the first connection portion.

* * * * *